Oct. 29, 1968   H. ROLFES   3,407,835
INSULATED HEATING OR COOLING SYSTEM FOR ELONGATED PIPES
Filed June 21, 1965
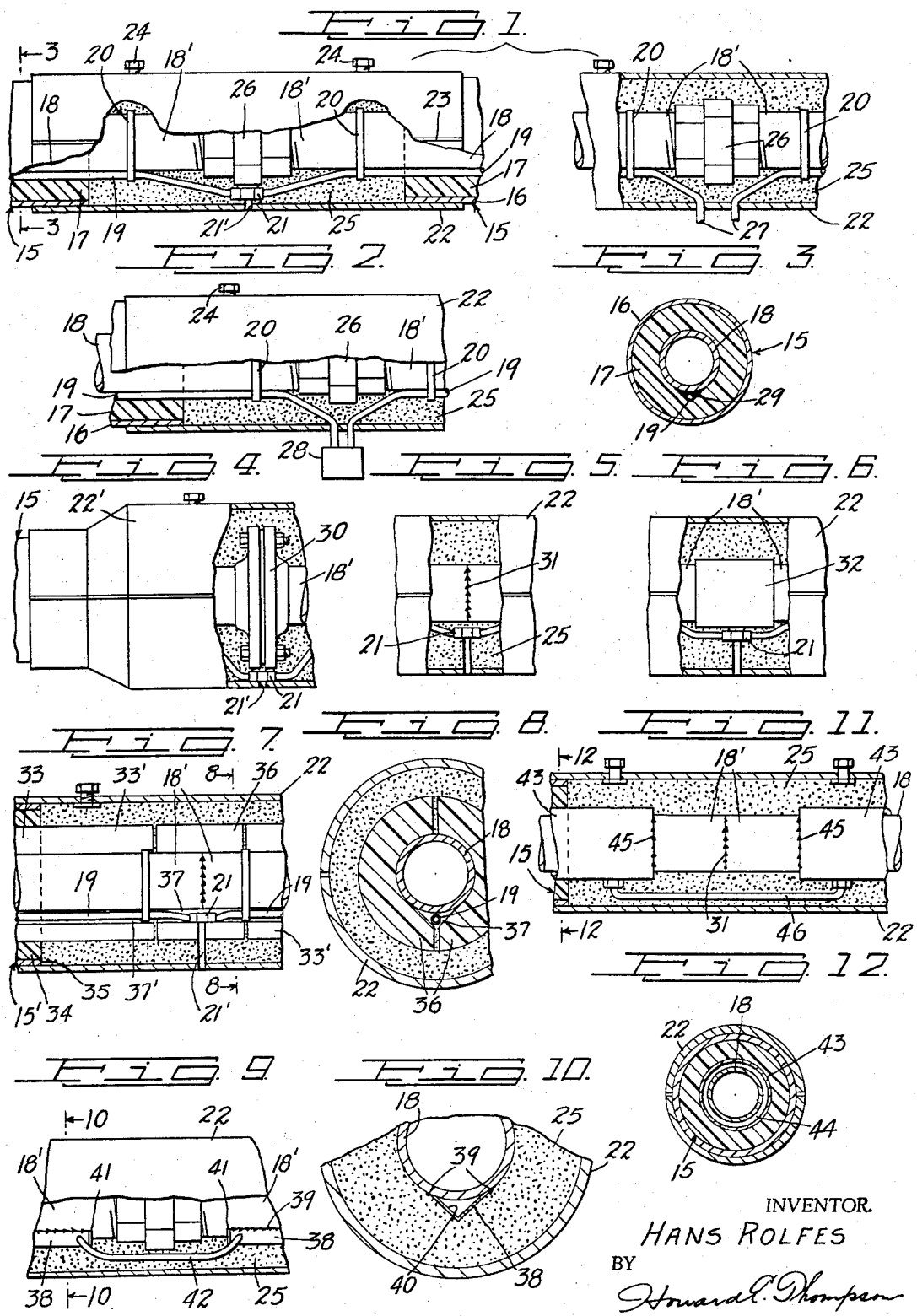
INVENTOR.
HANS ROLFES
BY
Howard C. Thompson
ATTORNEY United States Patent Office 3,407,835
Patented Oct. 29, 1968

3,407,835
INSULATED HEATING OR COOLING SYSTEM
FOR ELONGATED PIPES
Hans Rolfes, Bronx, N.Y., assignor to Trans Continental
Electronics Corp., New York, N.Y., a corporation of
New Jersey
Filed June 21, 1965, Ser. No. 465,620
15 Claims. (Cl. 137—340)

ABSTRACT OF THE DISCLOSURE

A system employing prefabricated pipe units, each unit comprising a pipe having a casing terminating short of the pipe ends and housing material insulating the pipe, with means extending longitudinally of the pipe and into coupling stations at ends of the pipe for circulating temperature controlling material, the coupling station including means for insulating couplings of pipes of adjacent coupled units and coupling of the means for circulating the temperature controlling material, and some of said stations including means for introducing the temperature controlling material to the units of the system.

---

This invention relates to the heating or cooling of pipes, through which a fluid medium is passed to control temperature characteristics of the medium. More particularly, the invention deals in a system, wherein means, such as a tube, channel or jacket, is employed in association with the pipe through which the fluid medium is passed and, wherein, a heating or cooling medium is circulated through such means in controlling the temperature of the medium passed through the pipe.

Still more particularly, the invention deals in a system employing prefabricated units or sections joined in field installed couplings, wherein varied types of connections or couplings are provided between the pipes of the units or sections.

The novel features of the invention will be best understood from the following description, when taken together with the accompanying drawing, in which certain embodiments of the invention are disclosed and, in which, the separates parts are designated by suitable reference characters in each of the views, and in which:

FIG. 1 is a bracketed illustration of elevational and sectional views of one method of carrying my invention into effect.

FIG. 2 is a view, generally similar to FIG. 1, of a modified form of coupling employing in one use of the system a steam trap.

FIG. 3 is a section on the line 3—3 of FIG. 1.

FIGS. 4, 5 and 6 are views, similar to the lefthand showing of FIG. 1, illustrating varied forms of couplings between pipe ends.

FIG. 7 is a sectional view illustrating a modified form of coupling from that illustrated at the left of FIG. 1.

FIG. 8 is an enlarged partial section on the line 8—8 of FIG. 7.

FIG. 9 is a view, generally similar to the showing at the left of FIG. 1, illustrating a modified form of structure.

FIG. 10 is an enlarged partial section on the line 10—10 of FIG. 9.

FIG. 11 is a sectional view, generally similar to the showing at the left of FIG. 1, showing another modification; and FIG. 12 is a section on the line 12—12 of FIG. 11.

Considering FIGS. 1 to 3, inclusive, at 15 I have shown prefabricated insulated units or sections of my system comprising an outer tubular casing 16 of waterproof material and such materials, for example, as extruded polyvinylchloride can be used. Arranged within the casing 16 is a suitable insulating material 17 which is foamed in place, or in other words, can be poured at the shop and such materials as polyurethane can be used. Arranged within the insulation 17 is a pipe 18. The pipe of each unit includes ends 18' which project beyond the casing 16 and insulation 17. Attached to the pipe 18 is a suitable heating or cooling medium circulating means such, for example, as a tube 19 fixed to the pipe 18 at suitably spaced intervals, as by straps 20. In coupling adjacent spaced units, adjacent the ends of the tubes 19 are coupled together by tube connectors 21 when the installation is being made at what can be referred to as coupling stations. Arranged upon the adjacent ends of the units 15 is a split coupling sleeve 22, the split ends of which are cemented or otherwise welded together, as at 23. After the coupling has been completed and, in some installations, a weep or other exhaust hole 21' is drilled in registration with the connector 21.

The sleeve 22 has spaced nipples 24 for pouring or otherwise positioning within the sleeve a body of insulating material 25, as diagrammatically illustrated by the stippling. This material can be of the same characteristics as the material in the insulation 17 has been shown stippled primarily to clearly illustrate and differentiate the preformed insulation 17 from the field installed insulation 25. In FIGS. 1 and 2, the pipe ends 18' are joined by a pipe union 26. At the right of FIG. 1, I have shown at 27 extension of the tubes 19 through the seeve 22 in providing supply at predetermined intervals for the media employed.

In different uses of the system, when the pipe 18 is to be heated in control of the medium circulated therethrough, steam, hot water, dowtherm and the like can be employed; whereas, if a cooling control is to be provided on the pipe 18, liquid nitrogen, oxygen, Freon or the like can be employed. At this time, it is pointed out that many various heating and cooling means can be employed which are commercially available and those enumerated are only by way of example.

As and when steam is employed as the heating medium, at predetermined intervals a steam trap 28 will be located in one of the couplings between adjacent units, as diagrammatically illustrated in FIG. 2 of the drawing. In FIGS. 1 to 3, inclusive, like references will identify like parts and, in considering FIG. 3, it will appear that, instead of using straps 20 throughout the length of the pipe 12, a suitable cement may be employed, as at 29 in retaining the tube 19 in longitudinal engagement with the pipe 18 within that part of the unit employing the insulation 17, in other words, in the initial assemblage of the parts and before 17 is positioned in the casing 16 and around the tube 18. In such latter uses, the straps 20 will be employed in support of the tubes 19 upon the ends 18' of the pipes 18, as diagrammatically seen in FIG. 1.

In FIG. 4 of the drawing, a modified form of coupling between the pipe ends 18 is illustrated, in other words, a flange coupling 30. With this form of construction, a modified form of sleeve 22' is employed to compensate for the larger diameter of the coupling.

In FIG. 5 of the drawing, I have diagrammatically illustrated at 31 a weld-type of coupling between the pipe ends 18'. In FIG. 6 of the drawing, I have shown at 32 a pipe coupling as a means for securing the pipe ends 18' together. Aside from these modifications, like parts will be identified by like references in the several showings in FIGS. 4 to 6, inclusive.

In FIGS. 7 and 8 of the drawing, I have shown a modification, wherein the units or sections 15' differ from 15 in employing an inner insulation 33, generally similar to the insulation 17, except that 33 is preferably a preformed insulation and includes extended portions 33' arranged upon part of the protruding pipe ends 18'. At 34 is illustrated an outer layer of insulation having a higher temperature rating than 33, the latter terminating at the end of the casing 35 of each unit or section 15'. With this construction, in assembling the coupling by the use of a coupling sleeve 22, similar in all respects to the sleeve shown in FIG. 1, a prefabricated insulated split or two-part sleeve 36 is employed intermediate the spaced ends of the extensions 33', as clearly noted in FIG. 7. The sleeve parts 36 are recessed, as seen at 37, FIG. 8, to receive the ends of the tubes 19 as well as the tube connector 21. With this construction, the weeper hole 21' would be longer in extending to 21, as will be apparent. It will also appear that the insulation 33, including the extension 33', has a recess 37' therein for receiving the tube 19. With this structure, the tube 19 could be assembled after 33 and 34 have been assembled in the casing 35.

In FIGS. 9 and 10 of the drawing, I have shown another modification of the structure shown in FIGS. 1 to 3, inclusive, wherein substantially V-shaped channels 38 are arranged longitudinally of the pipes 18, including their ends 18', and welded thereto, as diagrammatically seen at 39 to form media conducting chambers 40, which are substituted for the tubes 19. These chambers will have sealed ends 41, as noted in FIG. 9 of the drawing, and adjacent spaced ends of the channels 38 have tubes 42 communicating with the channel ends, as will be apparent. With structures of this type and kind, formations as shown at the right of FIG. 1 and in FIG. 2 can be employed, as and when and where required.

In FIGS. 11 and 12 of the drawing, I have shown a further modification of the structure shown in FIGS. 1 to 3, inclusive, wherein the means for conducting the media in heating or cooling the pipe 18 comprises tubular jackets 43 encircling the tubes 18 to form circumferential chambers 44, through which the heating or cooling media is free to pass. Ends of the jackets 43 are welded or otherwise sealed to the pipe ends 18, as diagrammatically seen at 45 in FIG. 11 of the drawing. The end portions of the jackets are joined by a tube connection 46 to place the chamber 44 of one jacket in communication with the chamber 44 of the adjacent jacket. Here again, the teachings in FIGS. 1 to 3, inclusive, will be employed in handling of various kinds of heating or cooling media.

It will be understood that the various types of pipe couplings shown in FIGS. 1, 2, 4, 5 and 6 can be employed in any of the modified showings illustrated. With structures of the type and kind under consideration, the required heating and/or cooling medium circulated through the pipes of the system can be effectively accomplished in a relatively simple installation where the units or sections of the system are prefabricated and the coupling of these units or sections is accomplished at the place of installation which, in many instances, will be a field installation. By virtue of the simplicity of the couplings employed, the units can be quickly and easily assembled and full installation maintained throughout the entire system.

For purposes of description, the heating or cooling media passed through the tube, channel or jacket can be generally referred to as the heating or cooling material, particularly in distinguishing the same from the medium passed through the pipe of the system.

Having fully described my invention, what I claim as new and desire to secure by Letters Patent is:

1. A system of the character defined comprising a plurality of prefabricated insulated pipe units united in spaced coupling stations, each unit comprisng an outer casing, a pipe within and spaced from said casing, the pipe having ends projecting beyond ends of said casing, means substantially filling the space between the pipe and casing for insulating the pipe in the casing, each of said stations comprising split sleeves supporting insulating means enveloping the pipe ends and means coupling said pipe ends at said station, means in each unit and extending longitudinally of said pipe and into said coupling stations for circulating a temperature control material in controlling temperature of a medium passed through the pipe of the system, means at predetermined stations for introducing the temperature control material to said fourth named means, and means at predetermined stations for bridging the third named means at such stations.

2. A system as defined in claim 1, wherein said fourth named means comprises a tube, through which the temperature control material is adapted to pass, and means supporting said tube in connection with the pipe in each unit.

3. A system as defined in claim 1, wherein said fourth named means comprises a channel fixed to the pipe of each unit, through which the temperature control material is adapted to pass.

4. A system as defined in claim 1, wherein said fourth named means comprises a tubular jacket enveloping the pipe of each unit and forming a chamber around the pipe, through which said temperature control material is adapted to pass.

5. A system as defined in claim 3, wherein predetermined stations include tubes coupling the channel of one unit with the channel of an adjacent unit.

6. A system as defined in claim 4, wherein predetermined stations include tubes coupling the jacket of one unit with the jacket of an adjacent unit.

7. A system as defined in claim 1, wherein predetermined stations will include steam traps as and when steam is utilized as the temperature control material.

8. A system as defined in claim 2, wherein predetermined stations include couplings between the tubes of adjacent units, and means at such stations providing weeper passages.

9. A system as defined in claim 1, wherein the first named means comprises two insulation bodies, one of said bodies of each unit including a prefabricated split tube, and said split tube being fashioned for the reception of said fourth named means.

10. A system as defined in claim 9, wherein said split tube insulation extends partially onto the pipe ends.

11. A system as defined in claim 10, wherein a preformed split tube insulating body envelops said third named means.

12. A system as defined in claim 1, wherein said third named means comprises a pipe union.

13. A system as defined in claim 1, wherein said third named means comprises a pipe flange.

14. A system as defined in claim 1, wherein said third named means comprises a pipe coupling.

15. A system as defined in claim 1, wherein said third named means comprises a weld between the pipes of adjacent units.

References Cited

UNITED STATES PATENTS

| | | | |
|---|---|---|---|
| 438,507 | 10/1890 | Tracey | 285—47 |
| 964,001 | 7/1910 | Dissosway | 137—375 |
| 1,451,242 | 4/1923 | Vibetz | 137—340 XR |
| 1,466,592 | 8/1923 | King | 137—375 |
| 1,960,866 | 5/1934 | Chadwick | 137—340 |
| 2,423,213 | 7/1947 | Weber | 285—47 |
| 2,568,578 | 9/1951 | Bennett | 137—375 XR |
| 2,658,527 | 11/1953 | Kaiser | 137—340 |
| 2,785,697 | 3/1957 | Sullender et al. | 137—340 |
| 2,984,899 | 5/1961 | Richter et al. | 285—41 XR |
| 3,199,898 | 8/1965 | Faccou | 137—340 XR |
| 3,207,174 | 9/1965 | Berczundki | 137—340 XR |

FOREIGN PATENTS 894,796   10/1953   Germany.

SAMUEL SCOTT, *Primary Examiner.*